May 29, 1956 H. SCHMID ET AL 2,747,496
AGITATOR FOR REMOVING CHAFF FROM ROASTED COFFEE
Original Filed Dec. 16, 1949 2 Sheets-Sheet 2

INVENTORS
Herman Schmid
BY Albert P. Hobush
William F. Nickel
ATTORNEY

United States Patent Office 2,747,496
Patented May 29, 1956

2,747,496
AGITATOR FOR REMOVING CHAFF FROM ROASTED COFFEE

Herman Schmid and Albert P. Hobush, Kingston, N. Y., assignors to Incoro, Inc., Kingston, N. Y., a corporation of New York Original application December 16, 1949, Serial No. 133,427, now Patent No. 2,700,225, dated January 25, 1955. Divided and this application August 21, 1951, Serial No. 242,852

9 Claims. (Cl. 99—236)

We have invented an improvement in machines for roasting coffee preparatory to grinding; and especially an attachment for such a machine to separate the chaff and ventilate the part of the machine in which the roasted coffee is deposited for removal.

Our roasting machine is to be used in connection with the retail distribution of coffee and operates upon green coffee in stock; roasting it in the required quantities from time to time, or on each sale, hence a dealer is able to supply perfectly fresh roasted coffee to individual purchasers.

An important object is to provide a coffee roasting machine having adjacent the roasting member a casing containing means for agitating and shifting the roasted coffee beans, to cool them and remove chaff before delivering the roasted coffee to a storage receptacle in the casing.

Another object is to provide a coffee roasting machine having an attachment for ventilating and cooling the roasted coffee beans as they are discharged into a storage receptacle.

The nature of the invention is fully described hereinafter and the preferred form of the invention is illustrated in the accompanying drawings. But this disclosure is explanatory only, and we may vary details of construction without departing from the principle of the machine.

On the drawings:

Figure 4 is a section of a detail.

Figure 5 is a section showing a conveyor to transfer roasted coffee to a bin to be withdrawn for grinding.

Figure 1:
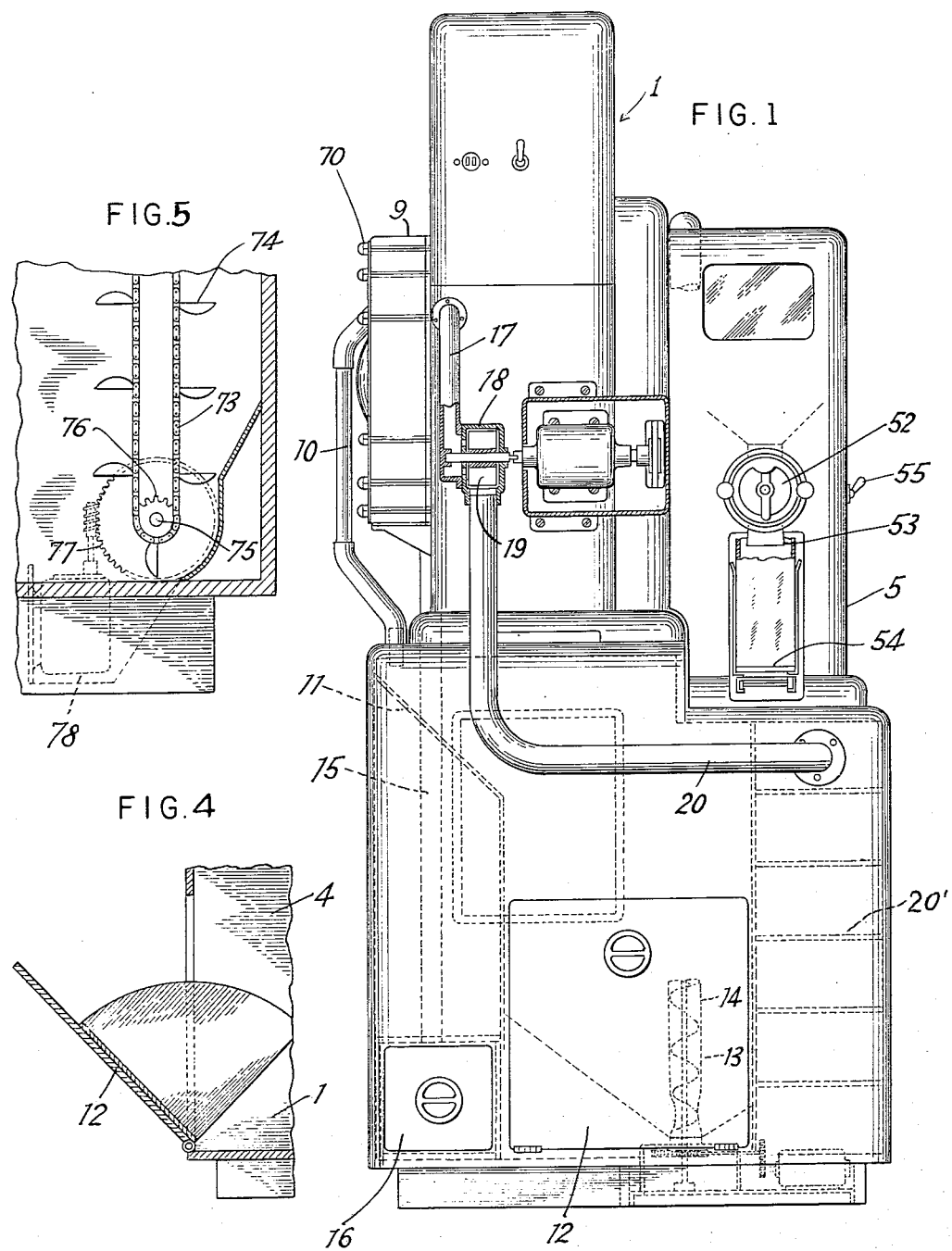
Figure 1 is a front view of a coffee roaster according to our invention.

This application is a division of our application for patent on a coffee roasting machine, Serial No. 133,427, filed December 16, 1949, said application has now matured into Patent No. 2,700,225, granted January 25, 1955.

The roaster and its adjuncts comprise a housing 1 consisting of separate sections. The coffee is roasted in a heater consisting of a chamber enclosing a rotating cylinder 2. At the top of the housing is a bin or hopper 3 for the green coffee beans, which are transferred to the heater; and afterwards piled in the base or lower part 4 of the roaster; from which they are lifted by a suitable conveyor, to be ground in a casing or section 5. The feeding of the green coffee from the bin 3 to the roasting cylinder 2 is regulated by a measuring drum 6; and the admission of the unroasted beans to the cylinder 2 is controlled by a chute 7, which automatically assumes loading and discharge position at the beginning and end of each roasting cycle. When the contents of the cylinder 2 have been treated as required they are delivered to a rotatable agitator 8 in a casing 9 on the housing 1, and finally dropped through a conduit 10 into the base section 4, which contains an inclined plate 11 which directs the roasted beans into a receptacle, to which access can be had by a gate 12. The gate is hinged at the bottom to the edge of an opening in the base, so that the coffee therein can be scooped out if desired.

The conveyor for lifting the roasted coffee from the receptacle or bin to the grinding apparatus is indicated at 13, in Figure 1; this conveyor being of the screw type in a tubular casing 14; and to the casing 9 of the agitator is connected a conduit 15, through which the chaff or husks covering the roasted beans are discharged into a removable drawer 16 at the bottom of the roaster. The vapors of the coffee when being roasted are drawn off through a flue 17 into a casing 18 containing a motor-driven fan 19; and conducted away to the base section 4 through a flue 20. The flue 17 of course leads from the heating chamber, connected to the housing adjacent the chute 7. The portion of the section 4 through which the flue 20 delivers, is enclosed and contains filters 20'; through which the vapors of the roasted coffee pass and are deodorized. They are then allowed to escape from the bottom of the space in the housing containing the filters, as set forth in our Patent No. 2,700,225, above-mentioned.

The hopper 3 for the green coffee has a sloping bottom 21 with a delivery opening at one side to register with a pocket or chamber 22 in the measuring and loading drum 6, that is just above the roasting cylinder 2. This drum is mounted to turn on a stud or journal 23, in a projection or foot bearing 24 in the housing. This bearing is part of a fixed horizontal transverse partition 25 in the housing over the cylinder 2. The chamber 22 is open at the upper and lower end, and after receiving coffee from the bin or hopper 3, it turns and discharges the green coffee beans through an outlet 26 in the partition 25. The top of the drum 6 is closed except for the pocket 22, and at the bottom thereof are external gear teeth 27 extending entirely around the circumference thereof to be engaged by a pivoted pawl at the end of a rocking lever for effecting rotation of the drum as required.

Adjacent one end of the cylinder 2, the wall of the housing has a large opening 28, and over this opening lies the closure plate 29 for the inner end of the casing 9. This plate has a hollow boss 30 in the center which bears the hub 31 of a gear 32 fixed to the chute 7. The casing 9 has a central bearing 33 in the outer end supporting one end of a stub shaft 34 upon which the agitator is mounted. This shaft has keyed connection with the end of the shaft 35 carrying the roasting cylinder 2 and its adjacent end is within the hub 31 and bearing 30. At the side of the plate 29 is an arc-shaped opening 36 in the housing extending from a point about the level of the shaft 35 down past a point directly below it. The plate 29 carries the bearing 30 at the center. The chute 7 is rotatable and the free end of the chute 7 as it turns, discharges the contents of the cylinder through it into the casing 9 when the roasting is finished. The plate 29 has a conical rim 37 about the lower edge of the opening 36 into the housing towards the cylinder 2.

Figure 2:
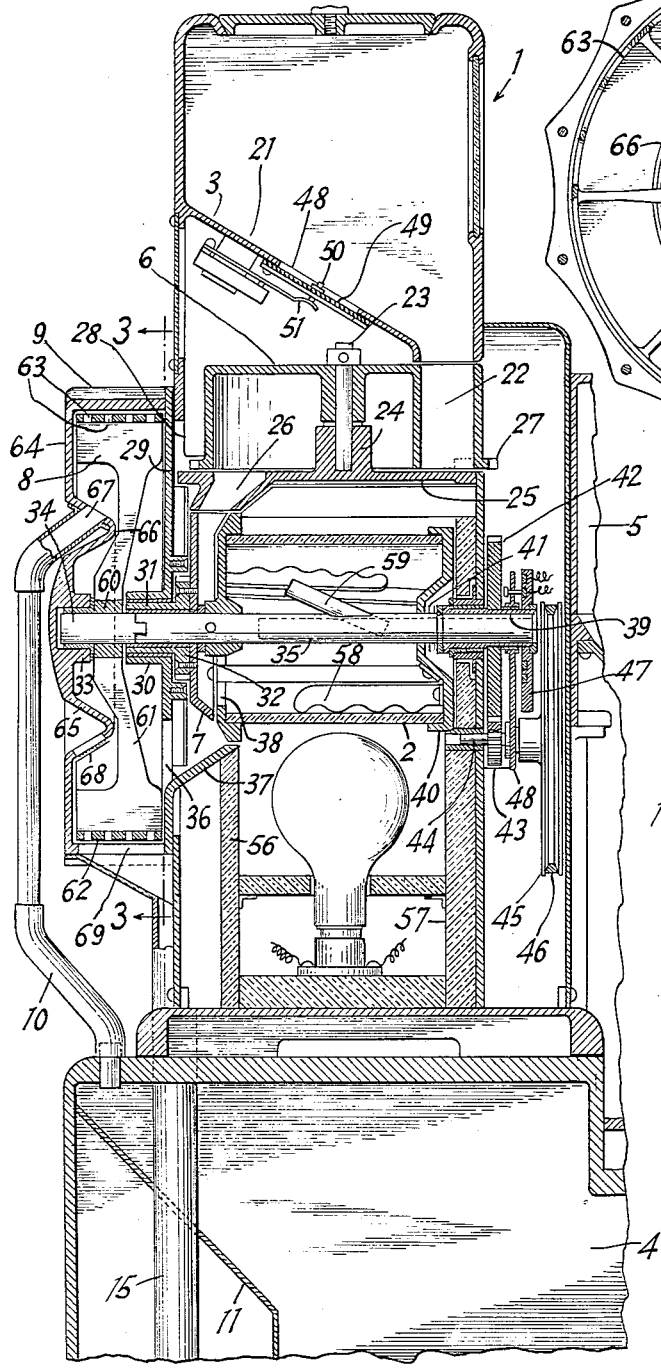
Figure 2 is a vertical longitudinal section in a plane passing from side to side through the middle of Figure 1.
Figure 3:
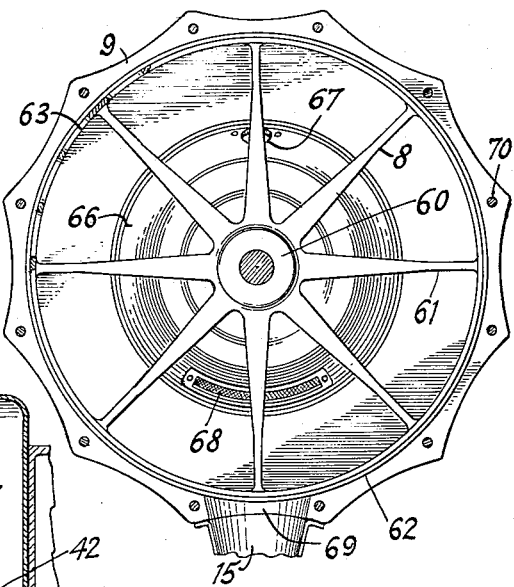
Figure 3 is a rear elevation of the agitator member in the apparatus with the rear cover plate removed, in the plane of line 3—3 on Figure 2.
Figure 6:
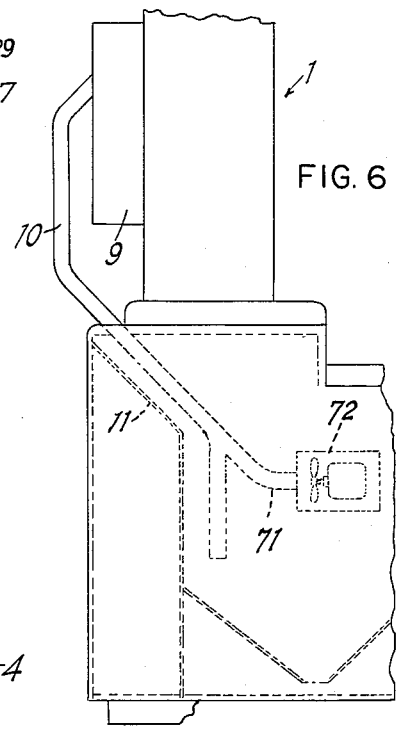
Figure 6 shows the cooling means for the agitator member.

The end of the cylinder 2 adjacent the chute 7 has an open spider 38 through which it discharges. This spider is covered by the chute 7 in the position shown on Figure 2 when the cylinder 2 is loading. When the drum 6 revolves it fills with green coffee from the hopper 3, the coffee dropping into the pocket 22 at each revolution; and the coffee is discharged as the drum rotates and the pocket 22 comes into registry with the outlet opening 26 in the partition 25. While the drum is turning, connecting members oscillate the gear 32 through a part turn each time, so that the chute 7 registers with the outlet 26 to fill the cylinder 2 and then makes a part turn to its lowermost position to guide the roast coffee from the cylinder 2 into the casing 9 through the opening 36. The connecting members are fully disclosed in our prior application aforesaid and are not comprised in the invention of this case.

The opposite end of the shaft 35 is enveloped by a sleeve 39, to which the shaft has key or clutch connection. The sleeve will therefore turn the shaft but the shaft can be detached from the sleeve like the stub shaft 34.

The end of the cylinder 2 adjacent the sleeve 39 is closed by a flanged-over metal disk or plate 40, and the sleeve 39 is mounted in a suitable bushing or bearing in the adjacent wall of the housing. The cylindrical wall of the cylinder 2 is made of heat resistant material and the plate 40 has a dished central part through which the shaft 35 passes. The shaft 35 has a spring washer and nut indicated at 41 between the sleeve 39 and the disk 40 to press against the disk and hold it in place on the cylinder 2.

The spider 38 is fixed to the shaft 35 at the end of the cylinder adjacent the chute 7. When the casing 9 is dismounted, the stub shaft 34 can be removed with it, and when the plate 29 is taken off the housing, the cylinder 2 can be pulled out through the opening 28. The main part of the shaft 35 then comes out with the cylinder, being pulled out of the sleeve 39 which can remain in place, but can also be taken out when necessary.

The outer end of the sleeve 39 carries a gear 42, which is turned by a gear 43 on a shaft 44, mounted in a bearing in the wall of the housing 1. On the outer end of this shaft is a pulley 45, which is rotated by a belt 46. This belt is operated by a pulley rotated by an electric motor on the outside of the housing. Fixed to the outer end of the sleeve 39 to be rotated thereby is a cam 47 and mounted on the sleeve 38 and shaft 44 so as not to interfere with the rotation of either is a metal plate 48 with insulated binding posts cooperating with contact rings on the cam 47 to form part of electric circuits which operate and control the machine. All these members and the mode of operation are fully disclosed in our aforesaid parent application Serial No. 133,427.

In the sloping bottom 21 of the hopper is an opening 48 which is covered by a flexible diaphragm 49. At the center of this diaphragm is a fixed button terminal 50 which cooperates with a movable switch terminal 51 on the lower face of the bottom 21. Both terminals are in circuit with the motor that rotates the pulley 45. When the hopper contains more than a minimum quantity of coffee, the swtich terminals 50 and 51 are closed by the weight of the required quantity of green coffee in the bin 3, but when this quantity is not present, the terminals aforesaid separate and the operation of the roaster stops.

The front of the section 5 has a knob 52 above an opening 53 in which there is a platform scale 54. This section contains the grinding mechanism and a motor to operate it, and the adjacent side bears switch 55 and an ordinary wall outlet, not shown, for the prongs of a plug that is attached to a cord conductor so that electric current may flow to energize the motor inside. The knob enables the operator to adjust for grinding the roasted coffee in several ways. This grinding mechanism is fully disclosed and defined in our copending application for a separate patent thereon, Serial No. 133,427, filed December 16, 1949.

The inside of the housing 1 containing the cylinder 2 constitutes a roasting chamber enveloping the cylinder 2. See Figure 2. One end of this is substantially closed adjacent the casing 9 by a partition 56 of heat insulating material. The top, bottom, sides and opposite end of this roasting chamber are of similar material, as indicated at 57. One or more heating lamps are mounted at the bottom of this chamber and several resistance heaters 58 and a thermostat 59 are mounted in the roasting cylinder 2. The partition 57 has an opening at the top receiving the end 38 of the cylinder 2.

The agitator 8 comprises a hub 60 fast on the stub shaft 34, with radiating arms or spokes 61 affixed to the hub, and carrying a circumferential ring or band 62. In the ring are openings 63 so that the ring has a sifting action. The outer end 64 of the casing 9 having the bearing 38 has a circular groove 65 in its outer face, this groove being triangular in cross section to form a rib 66 on the iner face of the casing 9. The uppermost part of the rib has an outlet opening 67 leading to the delivery pipe 10, and the lowermost part of this rib has a screened ventilator opening 68. In the bottom of the casing is a discharge opening 69 to which the flue 15 is coupled. The casing and plate 29 are attached to the housing by bolts 70.

The pipe 10 leading to the receptacle in the lower part 4 of the housing 1 is connected to a conduit 71 coupled to the casing 72 containing a fan driven by an electric motor. This motor is in circuit with the motor that rotates the cylinder 2, and rotates the fan 72 to cool off the roasted coffee beans delivered by the agitator to the pipe 10.

Instead of a screw conveyor 13, a chain conveyor 73 with cups 74, as shown in Figure 5, can be employed. This conveyor is operated by a shaft 75 bearing a sprocket wheel 76. On the shaft is a gear 77 in mesh with a worm gear on the shaft of an electric motor 78 controlled by a switch, so that it can be operated independently whenever coffee beans are to be elevated to the grinding apparatus in the section 5.

The construction and full operation of the entire roaster is fully described in our aforesaid application Serial No. 133,427 and the invention herein relates solely to the casing 8 and associated parts for cooling the roasted coffee and separating the chaff so that the roasted beans are delivered in the proper condition to the conduit 10.

When the roasting is finished the chute 7 is swung to put the cylinder into communication with the aperture 36 so that the contents of the cylinder 2 are transferred to the casing 8. The agitator whirls the roasted coffee around in the casing 9 so that the husks are broken and fall off; the husks being ground small and the particles passing through the perforations 63 and dropping into the conduit 15. The coffee beans flow in a steady stream through the outlet 67 through the conduit 10.

A guard rail may be affixed to the upper part of the lower section 4 to protect one or more sides of the housing of the apparatus.

Having described our invention, what we believe to be new is:

1. Roasting apparatus comprising a housing, a roasting cylinder therein, an external fixed casing on one side of the housing in line with one end of the cylinder, a shaft in the housing for supporting said cylinder, a short shaft in the casing detachably keyed to one end of the first named shaft, an agitator member enclosed in the casing on said short shaft, a sleeve in the housing receiving the other end of the first-named shaft and having a detachable operative connection therewith, a bearing in the housing enveloping said sleeve, and means on the sleeve to rotate the sleeve, the shafts, the cylinder and the agitator member.

2. Coffee roasting apparatus comprising a housing, a roasting member therein, the housing having an opening at one side through which the roasting member delivers, a fixed casing attached to the outside of the housing and communicating with said opening, the casing having a hollow circular rib in its outer end, a bearing for a shaft in said end, a shaft in said bearing, an agitator on said shaft, said agitator being enclosed in said casing and having radiating arms and a perforated sifting rim, the casing having an outlet opening for chaff in its bottom, the rib having two sides inclined to said end, and a delivery opening at its uppermost point, and a delivery conduit connected to the casing at said outlet opening and extending down to the lower part of said housing.

3. Coffee roasting apparatus comprising a housing, a roasting member therein, the housing having an opening at one side through which the roasting member delivers, a fixed casing attached to the outside of the housing and communicating with said opening, the casing having a hollow circular rib in its outer end, a bearing for a shaft in said end, a shaft in said bearing, an agitator on said shaft, said agitator being enclosed in said casing and having radiating arms and a perforated sifting rim, the casing having an outlet opening for chaff in its bottom, the rib having two sides inclined to said end, and a delivery opening in one of its sides at its uppermost point, and a delivery conduit connected to the casing at said delivery opening and extending down to the lower part of said housing, the apparatus also having a motor driven fan adjacent the lower part of the housing and a casing for the fan connected to the conduit near the lower end thereof.

4. Coffee roasting apparatus comprising a housing, a rotatable roasting cylinder therein, the housing having an opening at one side adjacent the cylinder, a fixed casing secured to the outside of the housing over said opening, the inner end of the casing being open, a closure plate over said inner end having an opening communicating with part of the first-named opening, a bearing at the middle of the plate, the outer end of the casing being closed and having another bearing in line with the first bearing, a shaft supporting the cylinder and having one end in the bearing on said plate, a short shaft having one end in the other bearing having detachable keyed connection with the first-named shaft, an agitator on said short shaft enclosed in the casing and having radiating arms and a perforated sifting rim, the casing having a delivery opening in the upper portion of its closed end, and a conduit joined to the casing at said delivery opening leading to the lower portion of the housing, said casing also having an outlet opening in its lower portion.

5. Coffee roasting apparatus comprising a housing, a rotatable roasting cylinder therein, the housing having an opening at one side adjacent the cylinder, a fixed casing secured to the outside of the housing over said opening, the inner end of the casing being open, a closure plate over said inner end having an opening communicating with part of the first-named opening, a bearing at the middle of the plate, the outer end of the casing being closed and having another bearing in line with the first-named bearing, a shaft supporting the cylinder having one end in the bearing on said plate, a short shaft having one end in the other bearing having detachable keyed connection with the first-named shaft, an agitator on said short shaft having radiating arms and a perforated sifting rim, the casing enclosed in the casing and having a delivery opening in the upper portion of its closed end, and a conduit joined to the casing at said delivery opening leading to the lower portion of the housing, said casing also having an outlet opening in its lower portion, the apparatus also having a fan and casing in its lower portion and a conduit connecting said fan casing to the lower part of the delivery conduit.

6. Coffee roasting apparatus comprising a housing, a rotatable roasting cylinder therein, the housing having an opening at one side adjacent the cylinder, a fixed casing secured to the outside of the housing over said opening, the inner end of the casing being open, a closure plate over said inner end having an opening communicating with part of the first-named opening, a bearing at the middle of the plate, the outer end of the casing being closed and having another bearing in line with the first-named bearing, a shaft supporting the cylinder having one end in the bearing on said plate, a short shaft having one end in the other bearing having detachable keyed connection with the first-named shaft, an agitator on said short shaft enclosed in the casing and having radiating arms and a perforated sifting rim, the casing having a delivery opening in the upper portion of its closed end, and a conduit joined to the casing at said delivery opening leading to the lower portion of the housing, said casing also having an outlet opening in its lower portion, the outer end of the casing having a hollow rib with two sides inclined to said outer end encircling the second-named bearing, the delivery opening being in one side of said rib at the uppermost part thereof.

7. Coffee roasting apparatus comprising a housing, a rotatable roasting cylinder therein, the housing having an opening at one side adjacent the cylinder, a fixed casing secured to the outside of the housing over said opening, the inner end of the casing being open, a closure plate over said inner end having an opening communicating with part of the first-named opening, a bearing at the middle of the plate, the outer end of the casing being closed and having another bearing in line with the first-named bearing, a shaft supporting the cylinder having one end in the bearing on said plate, a short shaft having one end in the other bearing having detachable keyed connection with the first-named shaft, an agitator on said short shaft enclosed in the casing and having radiating arms and a perforated sifting rim, the casing having a delivery opening in the upper portion of its closed end, and a conduit joined to the casing at said delivery opening leading to the lower portion of the housing, said casing also having an outlet opening in its lower portion, the outer end of the casing having a hollow rib with two sides inclined to said outer end encircling the second-named bearing, the delivery opening being in one side of said rib at the uppermost part thereof, the apparatus also having a fan and casing in its lower portion and a conduit connecting said fan casing to the lower part of the delivery conduit.

8. Coffee roasting apparatus comprising a housing having a top section containing a hopper, an intermediate section containing a roasting cylinder, a lower section containing storage space, a feeding drum between the hopper and the cylinder, said intermediate section having a casing with an agitator at one side and an opening through which the roasting cylinder discharges into said casing, operating mechanism for the cylinder at the opposite side of said intermediate section, said casing having a discharge conduit for roasted coffee and a discharge conduit for husks, connecting it to the lower section, a flue for vapors connected to the intermediate section and the lower section to conduct the vapors in the roasting cylinder to the lower section, a fan in said flue, a motor on said housing to operate said fan, and a filter in the lower section to which said flue delivers.

9. Roasting apparatus comprising an upright housing, a transversely disposed rotatable cylinder in the housing, a shaft extending across the housing carrying said cylinder, operating mechanism carried by the housing at one end of said shaft, a casing supported by said housing in line with said cylinder, adjacent the opposite end of said shaft, a rotatable agitator in the casing, said shaft having a detachable section on which the agitator is mounted in the casing, the housing having an opening in line with the casing, said shaft being detachably connected to said mechanism, so that said casing, said agitator and said section can be dismounted from the housing and disconnected from the shaft, and the cylinder, when said opening is uncovered, withdrawn through said opening from the housing.

References Cited in the file of this patent

UNITED STATES PATENTS

| | | |
|---|---|---|
| 155,300 | Grubb | Sept. 22, 1874 |
| 196,274 | Underwood | Oct. 16, 1877 |
| 1,668,629 | Church | May 8, 1928 |
| 2,415,307 | Richeson | Feb. 4, 1947 |

FOREIGN PATENTS

| | | |
|---|---|---|
| 252,523 | Switzerland | Oct. 1, 1948 |
| 304,181 | Great Britain | Sept. 30, 1929 |